Figure 1:
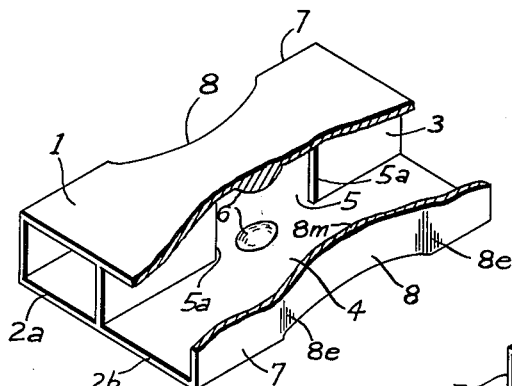

March 20, 1956     H. J. RIBLET     2,739,288

WAVE GUIDE HYBRID

Original Filed March 17, 1950     2 Sheets-Sheet 1

INVENTOR
Henry J. Riblet
By Ezekiel Wolf
his attorney

March 20, 1956   H. J. RIBLET   2,739,288
WAVE GUIDE HYBRID
Original Filed March 17, 1950   2 Sheets-Sheet 2
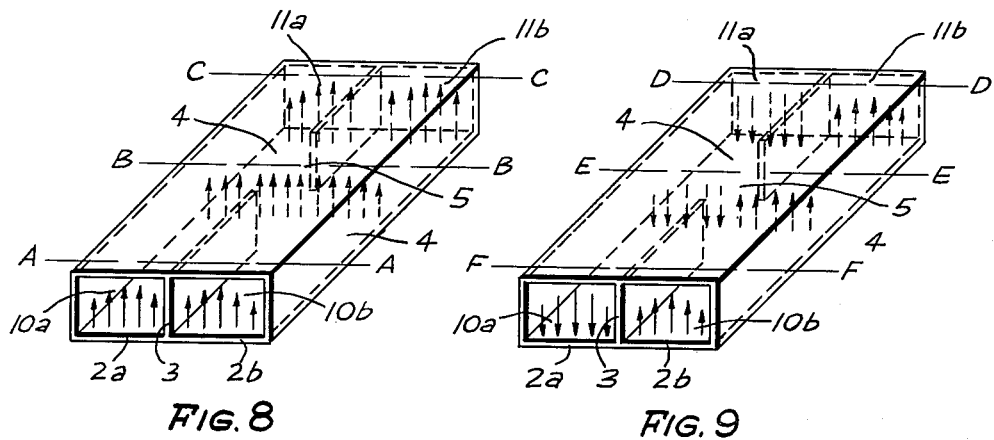
FIG. 8   FIG. 9
SYMMETRIC MODE
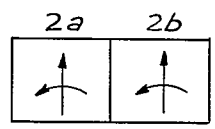
INCIDENT FIELD
(a)
ANTISYMMETRIC MODE
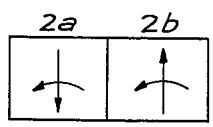
INCIDENT FIELD
(b)
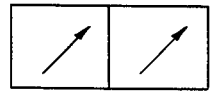
REFLECTED FIELD
(c)
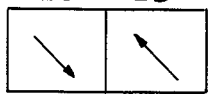
REFLECTED FIELD
(d)
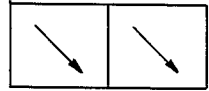
TRANSMITTED FIELD
(e)
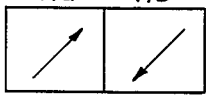
TRANSMITTED FIELD
(f)
FIG. 10
INVENTOR
Henry J. Riblet
By Ezekiel Wolf his attorney

United States Patent Office 2,739,288
Patented Mar. 20, 1956

2,739,288

WAVE GUIDE HYBRID

Henry J. Riblet, Wellesley, Mass.

Original application March 17, 1950, Serial No. 150,131. Divided and this application July 30, 1952, Serial No. 301,723

10 Claims. (Cl. 333—11)

This is a division of my application, Ser. No. 150,131, filed March 17, 1950, for Waveguide Hybrid Junctions, in the U. S. Patent Office.

This invention relates to waveguide hybrids as defined by W. A. Tyrrell in the P. I. R. E. November 1937, p. 1295.

A waveguide hybrid as defined by Tyrrell is a waveguide circuit, having four (two input and two output) waveguide terminals, which has the property that energy incident on one of the input terminals will divide evenly between the two output terminals with only a small fraction of the energy escaping through the other input terminal. In general, the less energy escaping out of the other input terminal, that is the greater the isolation between the two input terminals, assuming matched terminations on the output terminals of course, the better the hybrid. Similarly, the evener the power division at the output terminals, the better the hybrid. Needless to say no hybrid is ever perfect in either of these characteristics. For the purpose of this specification, I shall restrict the term hybrid to four terminal waveguide networks for which the power divisions is equal within a tolerance of 3 decibels and for which the power out of the other input terminal is 10 decibels less than the power incident on the first input terminal.

This invention relates to parallel guide hybrids having, for many applications, a useful configuration of terminals, and parallel guide hybrids which maintain their electrical characteristics over wide bands of frequency and are capable of handling high power without breakdown.

This invention further discloses specific embodiments wherein a waveguide hybrid employs a pair of substantially parallel rectangular waveguides, hence the name, having one of their narrow walls in common, said wall being apertured by a single hole which extends substantially the full height of the narrow common wall of the waveguide and which has a length approximately one free space wavelength at the mean operating frequency. The aperture in the common wall makes it possible for the section of the two parallel waveguides in its immediate vicinity to support the lowest $TE_{10}$ mode associated with a waveguide having twice the width of the original waveguides. (For diagrams of field configurations of the $TE_{10}$ and $TE_{20}$ modes reference is made to Schellkunoff: "Electromagnetic Waves," p. 395.) Signals in each waveguide which travel down the waveguides through the apertured section will be unaffected by the apertured common wall if the signals are of the same magnitude and are out of phase. If the signals are in phase, however, said signals upon reaching the apertured section will behave as a common signal in a single double width waveguide.

In the waveguide of double width, the phase velocity of a lowest mode $TE_{10}$ wave is substantially less than that in the original waveguides. Now a signal incident only on one waveguide can be resolved into identical in-phase and out-of-phase components in the two waveguides. In the coupling section, the phase of the in-phase component will advance more rapidly than the phase of the out-of-phase component, causing a resultant change in the vector sum of the signals in each guide and consequently a change in the relative power levels in the two guides. Thus by varying the length of the apertured section and hence the degree of phase difference between the in-phase and out-of-phase components, the amount of power transformed from one guide to the other may be regulated.

In addition, if the reflections back to the inputs to the guides for both the in-phase and out-of-phase components of a signal incident on only one guide happen to cancel out, then no energy will be reflected out of either input. Since the out-of-phase components are not affected by the aperture in the common wall, we have only to arrange it so that the reflection, for the in-phase components, from the front end of the aperture cancels out the reflections from the back end of the aperture in order that none of the signal incident on one of the input guides be sent out the other input waveguide.

My invention depends on my discovery that suitable dimensions for the apertured section may be chosen so that the condition for equal power division and the condition for high isolation between the input terminals can be satisfied simultaneously. Moreover these dimensions can be chosen so that the two conditions are satisfied simultaneously over wide ranges of frequency. Moreover the dimensions can be chosen so that the two conditions are satisfied simultaneously over wide ranges of frequency with a resulting hybrid structure which will handle high power levels without breakdown. The important dimensions of the apertured sections are its width, its height, its length and the amount of capacitive loading placed in the aperture. As will be pointed out in greater detail the width and height of the apertured section must be chosen so that only the first, $TE_{10}$ and second $TE_{20}$ modes are capable of propagating in the apertured section. Its length must be chosen so as to obtain the approximately desired power balance and then the capacitive loading selected to give the desired power balance simultaneously with the required high order of isolation between the input terminals.

Since these hybrids are inherently broad band devices it follows that their performance as hybrids is not critically determined by their dimensions and hence it is impossible to give sharply defined limits on the dimensions of the structure.

Figure 2:
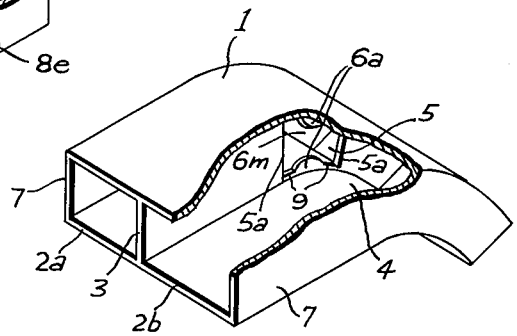
Figure 3:
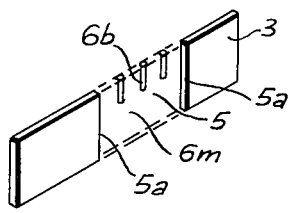
Figure 4:
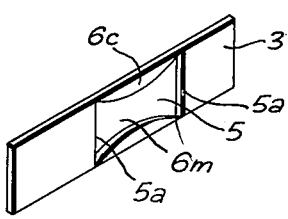
Figure 5:
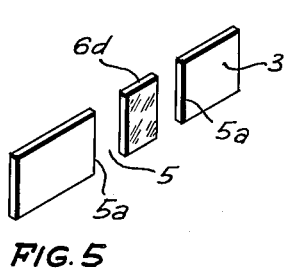
Figure 6:
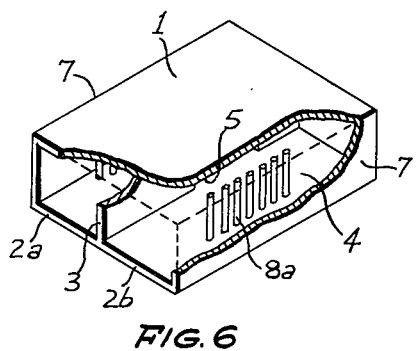
Figure 7:
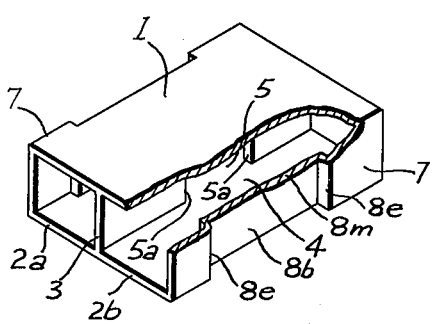

The invention may be more clearly understood by reference to the accompanying drawing, wherein Figure 1 gives a cutaway view of a preferred embodiment of my invention. Figure 2 is another embodimentt of my invention illustrating among other things how it may be bent in the E plane. Figures 3, 4, and 5 show alternate arrangements of the central wall of the hybrid which are capable of giving essentially the same performance as obtainable with the structure shown in Figures 1 and 2. Figures 6 and 7 show alternate configurations at the outer walls of the hybrid which are equivalent to that shown in Figure 1. Figures 8, 9, and 10 are schematic drawings to be used in explaining the operation of my invention.

Similar numerals refer to similar parts throughout the several views, in which:

The numeral 1 designates a waveguide hybrid composed of two waveguides 2a and 2b symmetrically joined along their common narrow walls 3. An aperture 5 is formed between waveguides 2a and 2b by removing substantially all of the common wall for a distance of approximately one "free-space" wavelength. The ends of the aperture are denoted by 5a. The center of this aperture 5 is provided with "wavelength-reducing" capacitive projections 6 which consist of flat rounded domes projecting into the central portions of the hybrid 1. The gap 6m is the minimum spacing between them. The outside walls 7 of the hybrid 1 are provided with "wavelength-increasing," inductive indentations 8 which are parallel the aperture 5 as shown in Figure 1. This indentation begins at 8e and reaches its narrowest point at 8m.

Figure 2 is an alternate arrangement of my hybrid differing from that of Figure 1 in that waveguides 2a and 2b are no longer straight but are bent in their E plane. Flat projections 6 have been replaced by thin fins 6a. In forming coupling aperture 5 a small amount of the common wall 3 has been retained as shown at 9. It will also be noticed no indentation has been provided in the outer walls 7 of hybrid 1.

In Figure 3, the coupling aperture 5 in the common wall 3 is provided with a plurality of metallic posts 6 of a capacitive nature. They project from only one wall, however. In Figure 4 tapered plates 6c add a distributed capacity to the coupling aperture 5. In Figure 5, the capacity is provided in the coupling aperture 5 by a dielectric slab 6d. As will be pointed out later in the specifications, the important characteristic which the several forms of capacitive loading 6—6d have in common is their ability to shorten the wavelength of the fundamental mode propagating in the coupling section 4. For this reason they will be collectively referred to as wavelength reducing means.

In Figure 6 the indentations 8 of the outer walls 7 of the hybrid 1 are replaced by a series of closely spaced inductive posts 8a. In Figure 7, the indentation 8b is straight instead of being tapered like the indentations 8 of Figure 1. It will be pointed out later that the characteristics which the several forms of inductive loading 8—8b have in common is their ability to increase the wavelength of the second mode, $TE_{20}$ propagating in the coupling section. For this reason these structures will be referred to as wavelength increasing means. It is further to be noticed that no capacitive loading is shown in the coupling apertures 5 of Figures 6 and 7.

For convenience in writing the specification and the claims to follow the following terms and symbols are specifically defined:

1. *Coupling aperture.*—The aperture 5 cut in the common wall 3 will be called the coupling aperture.

2. *Apertured section.*—The portion of the hybrid 1, containing the coupling aperture 5, which is capable of supporting the $TE_{10}$ as well as the $TE_{20}$ modes will be called the apertured section of the hybrid.

3. The length L of the apertured section 4 is the distance between the ends 5a of the coupling aperture.

4. The height H of the apertured section is the maximum distance between the top and bottom wide surfaces of the apertured section.

5. The medium width $W_m$ of the apertured section is the distance between the side (narrow) walls of the apertured section measured perpendicular to the common narrow wall 3 at the center of the coupling aperture.

6. The terminal width $W_t$ of the apertured section is the distance between the side (narrow) walls of the apertured section measured perpendicular to the common narrow wall 3 at the ends 5a of the coupling aperture.

7. The gap spacing $S_g$ is the minimum distance measured between the capacitive projections 6. In a case such as Figure 3, it will be the minimum distance from the capacitive projection to the opposite wall of the apertured section.

8. The indentation length $L_i$ is the distance measured along the length of the apertured section between the beginning and end 8e of the inductive loading 8 at the side walls of the hybrid.

In explaining the nature and operation of my invention reference is made to Figures 8–10. For the general purpose of explanation, it is convenient to picture the apertured section as consisting of two identical parallel waveguides with a length of the common wall removed as shown in Figures 8 and 9. Of course, all of the remarks to follow may be readily extended to any of the hybrids shown in the previous figures.

Figure 8 gives a schematic view of the distribution of the electric field in two waveguides when symmetrical fields are incident on input openings 10a and 10b of waveguides 2a and 2b. As shown in Figure 8, the field configuration will always be symmetrical about the center wall 3 so long as the hybrid 1 is mechanically symmetrical about this wall. It will be important in the explanation to follow to note especially that only symmetrical modes may be excited in the apertured section 4 of the hybrid 1 containing the aperture 5. As shown at section B—B in Figure 8 this mode is the $TE_{10}$ or lowest mode which may propagate in a waveguide having this width, it having been discovered that the next symmetric mode $TE_{30}$ must not be allowed to propagate in the apertured section 4. For the frequencies and waveguide sizes in common use this requires some means of filtering out this mode in the apertured section. This is accomplished in the preferred embodiment of this invention by the indentations 8 provided in the outer walls 7 for length of the apertured section 4, as shown in Figure 1. These indentations reduce the width of the apertured section to less than $\tfrac{3}{2}\lambda$ where $\lambda$ is the free space wavelength of the highest operating frequency of the hybrid. As is well known to the art this effectively suppresses the $TE_{30}$ mode. For some frequencies and guide sizes, as shown in Figure 2, indentations and the like are not required, the guide width itself being such that the $TE_{30}$ mode will not propagate in the apertured section. Of course, any other wavelength reducing means as for example a series of inductive posts 8a as shown in Figure 6 would have the same effect.

Figure 9 gives a schematic view of the distribution of the electric field in the two waveguides when antisymmetrical fields are incident on openings 10a and 10b of waveguides 2a and 2b. As is shown in Figure 9, the field configuration will always be antisymmetrical about the center wall 3 so long as the hybrid 1 is mechanically symmetrical about it and the excitation is antisymmetric. Thus the only mode which can be excited in the coupling section 4 under these conditions is the second $TE_{20}$, mode as is shown at section E—E in Figure 9. In particular the electric field in the connecting aperture 5 will be zero for this mode. Accordingly the capacitive loading 6 shown in my invention will have very little effect on this mode in the apertured section. When power is incident on the guide 2b at input terminal 10b, it proceeds along that waveguide until it encounters the apertured section. Here it begins to cross over into the other waveguide 2a. Under suitable conditions, by the time the energy reaches the end of the apertured section, it will have divided so that the power leaving at output terminal 11a just equals that leaving at output terminal 11b. If in addition no power leaves at input terminal 10a and none is reflected at input terminal 10b, assuming perfectly matched terminations at 11a and 11b, the structure is an ideal waveguide hybrid as previously defined. The basic conditions which the apertured section must satisfy in order that hybrid performance be realized can now be reduced.

Under the usual test conditions, energy is incident on a single input terminal of the hybrid, say terminal 10b. As is well known to the art (see Kyle: "Technique of Microwave Measurements, Radiation Laboratory Series", volume 11, p. 889) this situation may be obtained by the superposition of the two field configurations of Figures 8 and 9 if we assume that the incident voltages are given in magnitude and phase by the rotating vectors shown in Figures 10a and 10b. As we have seen, the symmetry and antisymmetry of these two modes is maintained in the apertured section. Accordingly the reflected and transmitted voltages in each mode will preserve the symmetry or antisymmetry of the incident voltages. This is shown for the reflected field in Figures 10c and 10d and for the transmitted field in Figures 10e and 10f. Of course, the phases and amplitudes of the reflected and transmitted voltages relative to each other and to the incident voltages will be determined by the geometry of the hybrid under consideration. We see immediately that the condition for complete isolation between input terminals $10a$ and $10b$ is that the reflected voltages in both modes shall add up to zero at terminal $10a$. A similar condition holds at terminal $10b$ in order that the input S. W. R. shall be unity. If both conditions are to be satisfied, we readily conclude from Figures $10c$ and $10d$ that the reflected voltages in the symmetric and antisymmetric modes must both be zero. This we shall call Condition 1 for an ideal parallel guide hybrid. For the hybrids of my invention this condition is satisfied approximately for the antisymmetric mode as we have already seen. Thus the principal effect of Condition 1 is to require that the apertured section be matched for the incident symmetric voltages of Figure 8.

Under the assumption that Condition 1 has been perfectly fulfilled, we see that the voltages shown in Figures $10e$ and $10f$ of the transmitted field in both modes are of exactly the same magnitude. Thus the manner in which the power is shared between the outputs is determined entirely by the phase relationships between these voltages at the output terminals $11a$ and $11b$. Of course until the apertured section is reached, there will be no relative phase shift and, of course, no power transferred into guide $2a$. The guide wavelength for the symmetric TE$_{10}$ mode will be less than the guide wavelength in the antisymmetric TE$_{20}$ mode in the apertured section and, of course, the relative phases will differ as a consequence. Once the apertured section has passed, the relative phases of the two modes are fixed and there is no possibility for further power transfer. This picture gives us two interesting consequences. In the first place, simple addition of the voltages of the transmitted fields of Figures $10e$ and $10f$ for arbitrary phases will show that the output voltages of the hybrid (on the assumption of unity standing wave ratio and infinite isolation) must always be ninety degrees out of phase. Moreover, if the device is to behave as a hybrid, the transmitted fields in the two modes must themselves differ by ninety degrees. Thus if Condition 1 is satisfied by a device as shown in Figures 1–9, Condition 2 for hybrid performance is that the length of the apertured section measured in electrical degrees for the symmetrical, TE$_{10}$, mode must exceed its electric length as measured for the antisymmetric TE$_{20}$ mode by ninety degrees.

The number of electrical degrees of phase shift for the antisymmetric mode in traversing the coupling section is approximately given by $L\lambda_a$, where L is the length of the apertured section as previously defined and $\lambda_a$ denotes the guide wavelength of the antisymmetric TE$_{20}$ mode in the apertured section. The number of electrical degrees of phase shift for the symmetrical TE$_{10}$ mode in transversing the apertured section is complicated by the reflections which take place at the ends $5e$ of the coupling aperture $5$ and at the capacitive loads $6$. If we denote the resulting phase shifts at these discontinuities by $\varphi_e$ and $\varphi_c$ respectively we have for the total phase shift in the apertured section for the symmetric mode $L/\lambda_s + \varphi_e + \varphi_c$ where $\lambda_s$ represents the guide wavelength in the apertured section for the symmetric TE$_{10}$ mode. Thus Condition 2 for hybrid performance can be expressed:

$$2\pi L\left(\frac{1}{\lambda_s} - \frac{1}{\lambda_a}\right) + \varphi_e + \varphi_c = 90°$$

I have discovered the following facts in regard to the dimensions of the elements of the apertured section which are important in constructing hybrids as pictured in Figures 1–7. They are:

1. The reflections in the symmetric TE$_{10}$ mode at the ends $5e$ of the coupling aperture $5$ are minimized by having the aperture $5$ extend the full height of the guide at its ends $5e$ as shown for example in Figure 3.

2. The impedance at the end $5e$ of the aperture $5$ as seen from the apertured section $4$ in the symmetric TE$_{10}$ mode is essentially an inductive susceptance that increases with decreasing wavelength, and decreasing terminal width W$_t$ of the apertured section measured at its end points $5e$ as previously defined.

3. The length of the apertured section required falls in the range $\frac{3}{4}$ $\lambda_{min}$ — 1.25 $\lambda_{max}$ where $\lambda_{min}$ and $\lambda_{max}$ are the minimum and maximum operating wavelengths respectively.

4. The terminal width W$_t$ of the coupling section in the vicinity of the ends of the aperture must be less than $\frac{5}{8}$ $\lambda$ of the free space wavelength at the highest operating frequency.

5. $\varphi_e$ and $\varphi_c$ are increasing functions of frequency whereas $$\left(\frac{1}{\lambda_s} - \frac{1}{\lambda_a}\right)$$

is a decreasing function of frequency.

6. Increasing the amount of the capacitive loading $6$ increases the frequency at which maximum isolation is realized and increases the power transfer through aperture.

7. The gap spacing S$_g$ is always greater than $\frac{1}{4}$ H where H has been defined as the height of the apertured section.

8. The point of minimum spacing between the capacitive loads should be located at or near the center of the aperture.

With this information one skilled in the art would have no difficulty in constructing a hybrid by following the following steps:

Construct a trial apertured section in which the coupling aperture has a length less than $\frac{3}{4}$ $\lambda$ at the maximum operating frequency. Provide a capacitive structure in the aperture which crosses the guide except for a gap which does not exceed one fourth the height of the guide. Measurements of the performance of the device and a review of the above experimental results will allow one to quickly determine the proper gap size and aperture length for hybrid performance. For example, reducing the size of the gap reduces the capacity, thus $\varphi_c$ and accordingly less power is transferred to output $11b$. Increasing the length of the coupling aperture, by a similar argument, increases the power transfer. It will now be observed, however, that the frequency of perfect isolation has been raised. Proceeding thus, one can satisfy Conditions 1 and 2 at the same time.

For example I have constructed, among others, hybrids whose internal dimensions fall within the given tolerances as follows:

| Hybrid No. | L | Inductive Loading | Capacitive Loading |
|---|---|---|---|
| 1 | 1.250″ | W$_t$=W$_m$=1.740″ | As in Figure 3, S$_g$=.153″. |
| 2 | 1.000″ | W$_t$=W$_m$=1.740″ | As in Figure 4, S$_g$=.150″. |
| 3 | 1.270″ | W$_t$=W$_m$=1.708″ | As in Figure 2, S$_g$=.250″. |
| 4 | 1.210″ | W$_t$=1.770, W$_m$=1.650″ | None. |
| 5 | 1.210″ | W$_t$=1.770, W$_m$=1.714″ | Single Central Post S$_g$=.244″. |
| 6 | 1.180″ | W$_t$=1.770, W$_m$=1.710″ | Flat symmetrical domes as in Fig. 1, S$_g$=.300″. |

All of these hybrids had apertured sections whose heights were .400″. Measurements were centered at 3.3 centimeters and hybrid performance was obtained over bandwidths considerably in excess of 12%.

As will be clear to one skilled in the art, the height of the apertured section is immaterial to the performance of these hybrids as long as the capacitive loading does not excite any mode other than the TE$_{10}$ and TE$_{20}$ modes. Clearly apertured sections of greater height can be used if the capacitive obstructions are symmetrically placed on the top and bottom of the apertured section than for asymmetrical loading. As hybrid 4 shows, however, the capacitive projection may project from only one side.

Although hybrids constructed in accordance with the above procedure operate very satisfactorily, it has been found that certain additional precautions tend to improve the hybrid characteristics over a specified bandwidth. In the first place the TE$_{30}$ mode must not be allowed to propagate in the apertured section. This requires that $W_t$ and $W_m$ for the apertured section shall be less than $\frac{3}{2}\lambda$ where $\lambda$ is the free space wavelength at the highest operating frequency. Furthermore to minimize reflections at the ends of the aperture for the TE$_{10}$ mode, the terminal width, $W_t$, of the apertured section must be somewhat greater than the free space wavelength at the lowest operating frequency. I have also learned that the aperture must extend at least 75% of the full height of the guide at its extremities.

The basis for broad band power division characteristics rests on my discovery that there exist dimensions within the tolerances given so that Condition 2 is satisfied over wide bands of frequency. This depends on the fact that there exist values of L, and $\varphi_c$ so that the increasing frequency characteristics of $\varphi_a$ and $\varphi_c$ are just balanced by the decreasing frequency characteristic of $$\left(\frac{1}{\lambda_s} - \frac{1}{\lambda_a}\right)$$

The basis for the broad band isolation and S. W. R. characteristic depends on my discovery that capacitive loadings may be determined which match out the reflections from the ends of the apertures over wide bands of frequency. This possibility may be attributed to the compensating phase and magnitude characteristics of the reflection from the ends of the aperture as seen from its center.

To obtain a broad band hybrid then one has only to start with an apertured section for which the above conditions are satisfied by the coupling aperture and apertured section and proceed as before to obtain hybrid performance at the center of the desired frequency band. Comparison of the performance over the required band of several hybrids obtained in this way starting with different width aperture sections will readily allow the designer to obtain a hybrid whose characteristics are broad band.

I have also discovered that small improvements in performance are obtained by a gradual pinching in of the outer wall of the coupling section as shown at 8$m$ in Figure 1 and by properly choosing the distance $L_1$ between the ends 8$e$ of the inductive loading 8 of Figure 8.

For example I have constructed hybrids of the type pictured in Figure 1 in which $L=1.205''$, $W_t=1.775''$, $W_m=1.710''$ and the spacing between the tips of flat $\frac{1}{2}''$ diameter domes is 70% of H for which the power balance out terminals 11$a$ and 11$b$ is equal to within $\pm.2$ db, the isolation between inputs 10$a$ and 10$b$ is in excess of 30 db and for which the S. W. R.$\leq$1.05 over the frequency band from 8500 to 9600 mc. For this performance $L_1=1.500''$.

It is known that many variations in the dimensions of the coupling section may be made without seriously impairing the performance characteristics of these hybrids. For example, complete end for end symmetry is not essential nor must the capacitive projections be placed exactly in the coupling aperture. These changes however, do not depart from the spirit of this invention in which I claim:

1. A hybrid junction operative over a relatively broad microwave spectrum centered at a predetermined midband frequency comprising, a hollow generally rectangular conductive structure having pairs of opposed broad and narrow walls, a conductive partition extending longitudinally through said structure coextensively with and substantially intermediate said narrow walls, said partition thereby dividing said structure into first and second like waveguides of substantially rectangular cross section having a common narrow wall each dimensioned for normal propagation of microwave energy only in the T. E.$_{1,0}$ mode over said microwave spectrum, said partition being provided with a lengthwise aperture coupling said first and second waveguides and defining an apertured section whose width at any point is determined by the spacing of said narrow walls, said apertured section being capable of propagating microwave energy in both T. E.$_{1,0}$ and T. E.$_{2,0}$ modes throughout said microwave spectrum, inductive means associated with said apertured section for effectively precluding propagation of microwave energy in said apertured section in the T. E.$_{3,0}$ mode throughout said microwave spectrum, said aperture having a height equal to the spacing between said broad walls, and centrally disposed means for capacitively loading said aperture, said aperture length, capacitive loading and apertured section configuration being mutually arranged whereby for all frequencies throughout said microwave spectrum, the electrical length of said apertured section for said T. E.$_{1,0}$ mode is substantially ninety degrees greater than the electrical length thereof for said T. E.$_{2,0}$ mode and further, whereby substantially no microwave energy is reflected by said apertured section, including said ends of said aperture, said capacitive loading means and said inductive means, in the transmission of microwave energy therethrough in said T. E.$_{1,0}$ and T. E.$_{2,0}$ modes throughout said spectrum.

2. Apparatus as in claim 1 wherein said narrow walls are formed with confronting indentations in the region of said apertured section to provide said inductive means.

3. Apparatus as in claim 2 wherein said confronting indentations are gradually tapered from each end whereby the minimum apertured section width lies substantially in the central region thereof.

4. Apparatus as in claim 1 wherein said inductive means comprises an inductive element extending longitudinally beyond said apertured section.

5. Apparatus as in claim 2 wherein said inductive indentations extend longitudinally beyond the ends of said apertured section to enhance hybrid performance.

6. Apparatus as in claim 1 wherein said narrow walls are formed with confronting rectangular indentations in the region of said apertured section to provide said inductive means.

7. Apparatus as in claim 6 wherein said rectangular indentations extend longitudinally beyond the ends of said apertured section.

8. Apparatus as in claim 1 wherein said inductive means precluding propagation of microwave energy in said T. E.$_{3,0}$ mode are disposed within said apertured section adjacent said opposed narrow walls.

9. A hybrid junction operative over a relatively broad microwave spectrum centered at a predetermined midband frequency comprising, a hollow rectangular conductive structure having substantially plane parallel broad walls and a pair of opposed narrow walls, a conductive partition extending longitudinally through said structure coextensively with and substantially intermediate said narrow walls, said partition thereby dividing said structure into first and second like waveguides of rectangular cross section throughout having a common narrow wall each dimensioned for normal propagation of microwave energy only in the T. E.$_{1,0}$ mode over said microwave spectrum, said partition being provided with a lengthwise aperture of substantially rectangular cross section coupling said first and second waveguides and defining an apertured section whose width at any point is determined by the spacing of said narrow walls, said apertured section being capable of sustaining the propagation of microwave energy in both T. E.$_{1,0}$ and T. E.$_{2,0}$ modes throughout said microwave spectrum, said narrow walls being spaced and arranged in the region of said apertured section to effectively preclude propagation therein in the T. E.$_{3,0}$ mode at all frequencies throughout said microwave spectrum, said aperture having a height at the ends thereof substantially equal to the spacing between said narrow walls, and centrally disposed means for capacitively loading said aperture, said aperture length, capacitive loading and apertured section configuration being mutually arranged whereby for all frequencies throughout said microwave spectrum, the electrical length of said apertured section for said T. $E_{.1, 0}$ mode is substantially ninety degrees greater than the electrical length thereof for said T. $E_{.2, 0}$ mode and further, whereby substantially no microwave energy is reflected by said apertured section, including said ends of said aperture and said capacitive loading means, in the transmission of microwave energy therethrough in said T. $E_{.1, 0}$ and T. $E_{.2, 0}$ modes throughout said spectrum.

10. Apparatus as in claim 9 wherein said narrow walls in the region of said apertured section are indented and thereby spaced less than one and one-half times the free space wavelength of the highest frequency of said microwave spectrum to preclude propagation through said apertured section of the T. $E_{.3, 0}$ mode at any frequency in said spectrum.

References Cited in the file of this patent

UNITED STATES PATENTS

| | | |
|---|---|---|
| 2,615,982 | Zaslavsky | Oct. 28, 1952 |
| 2,643,295 | Lippmann et al. | June 23, 1953 |

FOREIGN PATENTS

| | | |
|---|---|---|
| 964,637 | France | Feb. 1, 1950 |

OTHER REFERENCES

Surdin: "Directive Couplers in Waveguides," The Journal of the I. E. E., vol. 93, Pt. III A, No. 4, 1946. (Copy in Div. 69.)